United States Patent Office 2,898,440
Patented Aug. 4, 1959

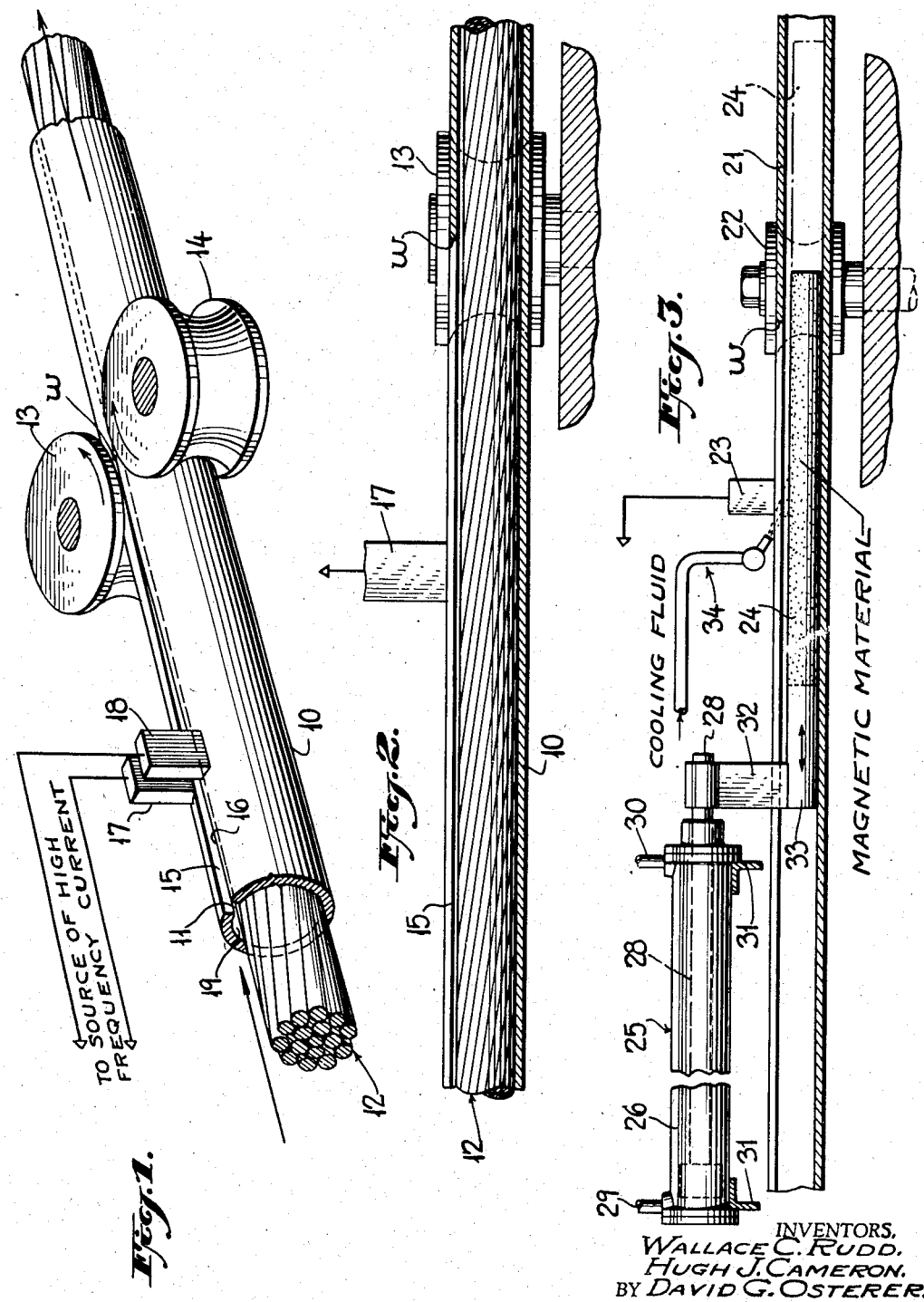

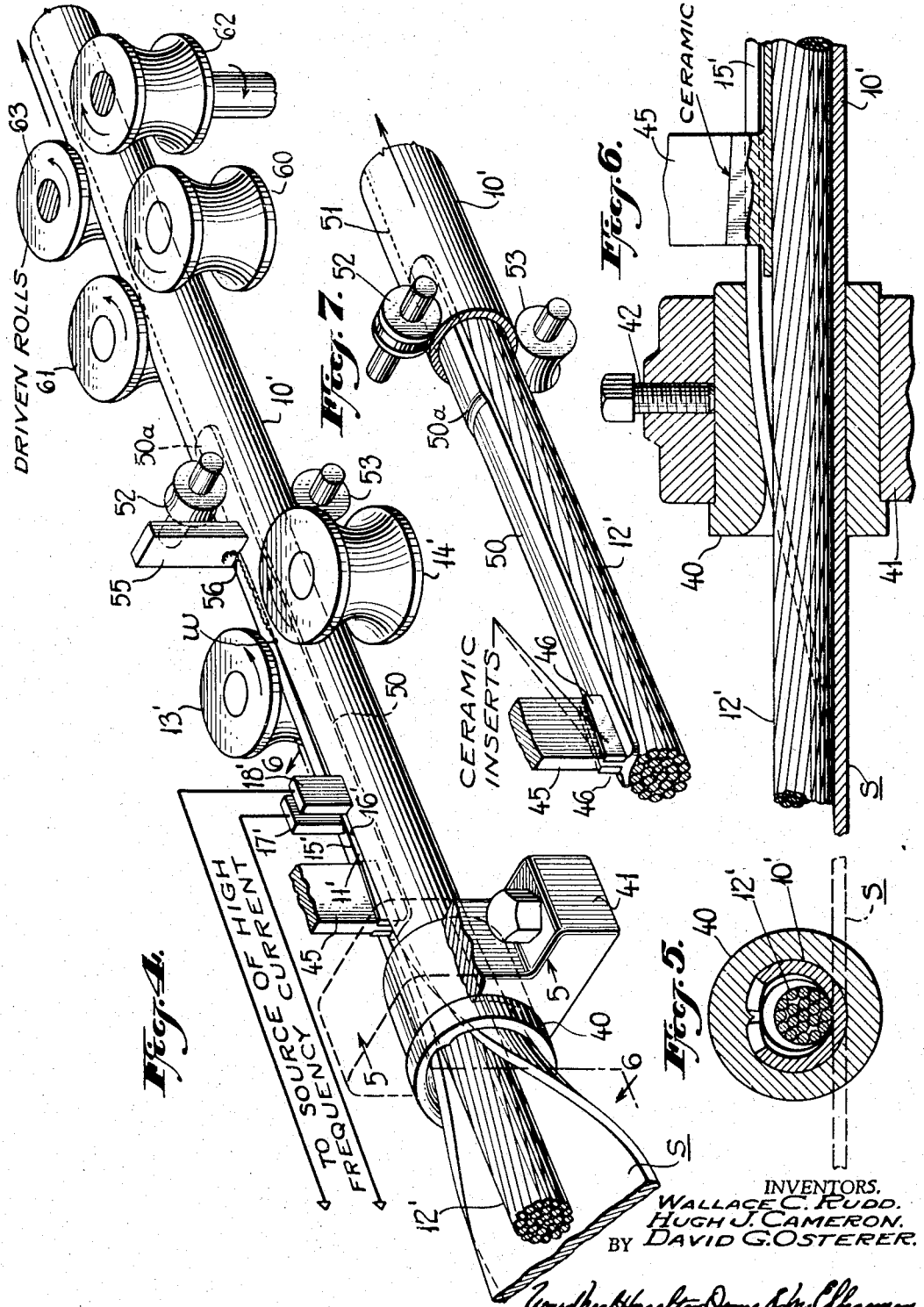

2,898,440

FORMING AND WELDING METAL TUBES AND SHEATHS

Wallace C. Rudd, Larchmont, Hugh J. Cameron, New Rochelle, and David G. Osterer, Harrison, N.Y., assignors to Magnetic Heating Corp., New Rochelle, N.Y., a corporation of New York Application June 7, 1957, Serial No. 664,287

8 Claims. (Cl. 219—59)

This invention relates to methods and apparatus for forming and for welding metal tubing and sheaths and more particularly for means for shaping strips into tubular form and for then welding a seam thereon by the use of high frequency electrical resistance heating. Among other possible uses, the invention has particular utility for the continuous forming of metal sheaths surrounding cables contained therein and for at the same time welding longitudinal seams on such sheaths.

With commonly used methods for forming metal tubing, a continuous metal strip is advanced through a tube mill and thereby formed to tubular shape with a longitudinally extending gap. As the tubular shape is further advanced through the tube mill, means are provided to apply pressure for closing the gap and at the same time for forming a welded seam.

One means by which the welding can be accomplished is disclosed in the co-pending application of Robert J. Stanton and Wallace C. Rudd, Serial No. 592,702, filed March 14, 1956, on which Patent No. 2,833,910 was granted on May 6, 1958, and another of their co-pending applications, Serial No. 421,768, filed April 8, 1954, on which Patent No. 2,818,488 was granted on December 31, 1957. These patents disclose a method and apparatus for welding together the edges defining a longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent to gap edges at points positioned shortly in advance of the welding point, the current being of a frequency sufficiently high so that the lowest impedance path between the electrodes follows said gap edges to and from the weld point. In these patents, it was pointed out that in some cases, for example, if the tube diameter is relatively small, there will be a tendency for at least some part of the current to flow circumferentially around the tube instead of along the edges of the V-shaped gap and there may be a tendency for the weld point to vary its position with loss of efficiency and irregularities in the weld. As further pointed out in said prior disclosures, these difficulties may be minimized by increasing the impedance of the current path from one of the contacts circumferentially around the tubing to the other, by mounting within the tubing or adjacent thereto, suitable forms of magnetic core means, with the result that the increased impedance of this path causes the current to be more effectively concentrated where it is desired, that is, along the V-shaped gap edges. Also the position of the weld point becomes more dependably stabilized at a fixed point. The possible speed of the welding of the tubing may therefore be greatly increased and the quality and uniformity of the weld may be improved.

These co-pending applications disclosed that the magnetic core means preferably comprises, for example, rods of sintered magnetic oxide insulation material of known types which have a low loss factor and high volume resistivity, for example, such as the material marketed under the trade name "Ferramic" by General Ceramics and Steatite Corporation. This material is a non-electrical conductor and has a Curie point in the range of 200° to 300° F. However, since the heated tube edges at and near the weld point will come very close to such material, particularly if the tube diameter is small, sufficient radiant heat may reach such core material either to injure same or to raise its temperature above the Curie point temperature so that it ceases to function properly.

As disclosed in said Patent No. 2,833,910, it was found that these problems may be satisfactorily overcome by surrounding the magnetic core material by suitable container means, such as copper tubing, which in turn is mounted within the advancing tubing being welded and which container means also, preferably, is arranged to be continuously fluid cooled. However, in accordance with the present invention, a solution to these problems is accomplished in a different manner.

This invention provides a method and apparatus which during the welding operation provides a core means which continuously moves in the tubing being welded and thus changes the surface portions of the core material which are adjacent the electrical contacts and the heated edges of the tubing. By this expedient no single surface portion of the core means absorbs excessive amounts of heat. In addition, no single portion of the core is continually exposed to the heat at the edges of the tubing being actively welded.

More specifically, the invention in one of its forms involves continuously advancing along with the tubing, a continuous core member contained therein, such core member in one of its preferred forms comprising a steel cable which, if desired, may be left within the welded tubing so that the product will comprise a welded tube or sheath formed for example of copper surrounding a core in the form of a length of steel cable or a cable comprising in part at least, a strand or strands of magnetic material. According to another embodiment of the invention, as the tubing is advanced and the seam thereon is welded, a core is mounted therein and arranged to be longitudinally reciprocated, or reciprocated and also rotated if desired, so that no one portion of the core will remain continuously in a position close to the heated areas on the tubing being welded.

The usual forms of tube mills adapted for shaping the strips of tubular form and for advancing same while being welded are quite elaborate and expensive since they involve numerous rollers, stands and other equipment usually of a heavy and relatively complicated nature. According to another aspect of the present invention, instead of using a tube mill to shape and advance the tubing, a much less expensive and less complicated means is provided in the form of a die member or a plurality of succeeding die members, if necessary, through which the metal strip is drawn and thereby shaped to tubular form just in advance of the means for welding the longitudinal seam thereon. This aspect of the invention is particularly well adapted for use when an extended length of electrical cable or the like is to be enclosed in a metal sheath.

With prior methods for heating the metal to form the welded seam by induction heating, it has not generally been possible practically to form a satisfactory welded seam on non-ferrous metal sheaths such as copper or aluminum or alloys thereof, for various reasons. Furthermore, it has not been possible to form such a welded sheath while a cable is contained therein for various reasons, either by such induction heating methods or by ordinary low frequency alternating current or direct current resistance heating. The space within the tube or sheath has necessarily, with such methods, been occupied by core means or other devices precluding the presence of an advancing cable in the sheath as being formed. Also, with such prior methods, if it were possible to contain a cable within a sheath as a welded seam is being formed, the cable would be endangered by over-heating. The present invention overcomes these difficulties.

A further aspect of the present invention involves the provision of means for smoothing out or substantially eliminating any irregular surface portions along the welded seam, both internally and externally of the sheath as the same is being welded and notwithstanding the presence of a cable contained within the sheath.

Various further and more specific objects, features and advantages of the invention will appear from the description given below, taken in connection with the accompanying drawings, illustrating by way of example certain preferred forms of the invention.

In the drawings:

Fig. 1 is a schematic perspective view of one form of the invention;

Fig. 2 is a longitudinal sectional view taken on a vertical plane through the form of the invention illustrated in Fig. 1;

Fig. 3 is a schematic view, partly in section, of another embodiment of the invention;

Fig. 4 is a perspective view of another embodiment of the invention including die means for shaping metal strips into the desired tubular form and surrounding, if desired, an advancing cable contained within the sheath as formed and welded, this embodiment also including means for smoothing out or eliminating irregularities along the welded seam both internally and externally of the tubing;

Fig. 5 is a typical vertical transverse sectional view taken along line 5—5 of Fig. 4;

Fig. 6 is a vertical longitudinal sectional view taken along line 6—6 of Fig. 4; and Fig. 7 is a perspective view, partially broken away, showing the means for smoothing out or eliminating irregularities along the welded seam.

Referring to Figs. 1 and 2, numeral 10 indicates the initial blank which is to be welded. This blank has been shaped into the approximate contour of the desired tube diameter having only the longitudinal V-shaped gap 11 separating the edges of the blank. The tube houses a multistrand steel cable generally designated by numeral 12. This cable may be comprised of a plurality of helically twisted wires such as are sometimes used to constitute or to form a core for communication cables. Each strand, or the cable as a whole, may in some cases be insulated.

The entire assembly of the tube, acting as a sheath, and the cable is advanced in a longitudinal direction indicated by the arrows by any convenient or conventional means, the welded sheath with the cable therein being finally wound into a coil as by a suitable power driven reel (not shown). The advancing means as shown may include power driven pressure-applying rollers 13 and 14. These rollers engage opposite sides of the tube near the weld point $w$ to urge the opposite faces 15 and 16 within the gap 11 firmly against each other. These gap edges are advanced by the rollers past contacts 17 and 18. These contacts, or electrodes, are provided with connections to a suitable source of high-frequency current. The frequency should be of the order of about 100,000 cycles per second, or preferably more. For best results the frequency should be as high as 300,000 or 500,000 cycles per second, or more. The electrical contacts 17 and 18 are preferably fluid-cooled as disclosed in the above-mentioned patents.

The contacts are located slidably to engage at or adjacent the gap edges a suitable distance in advance of the weld point. Since the cable and tube blank advance simultaneously past the contacts, it is seen that no surface portion of the cable is exposed continuously to the heat of the welding process. The cable is thus well capable of withstanding without injury such heat as it receives in rapidly passing the weld point.

With the embodiment of the invention shown in Fig. 1, the cable functions as a magnetic core impedor to increase the impedance of the circumferential current paths on the metal of the tubing. As a result, the current is closely concentrated where it is most desired; that is, along the edges of the V-shaped gap. This insures that efficient use is made of the welding current. By this expedient, the advantages of the methods disclosed in the above-mentioned co-pending applications are attained, while also permitting formation of a welded sheathed cable.

It will be noted that the sheath or tube blank 10 as shown, is slightly larger than the outside diameter of the cable. Thus, by the action of gravity, as the cable advances, it will rest on the lower inside surface of the tubing and out of contact with the current carrying portions along the tube gap, the spacing being indicated by numeral 19.

If in the finished product it is desired to have the sheath closely embrace the cable, this may be accomplished by passing the assembly at some point subsequent to the weld point, through a suitable known form of swaging apparatus.

The embodiment illustrated above in connection with Figs. 1 and 2, illustrates moving the magnetic core material continuously past the heating area. By virtue of this expedient, no single portion of the core material is required to absorb an excessive amount of heat. Another means by which this may be accomplished is illustrated in Fig. 3.

In Fig. 3, the tube 21 may be the same as the tube 10 of Figs. 1 and 2, but does not carry its own impeder such as the cable 12. The means of moving or advancing the tube 21 may also be the same as that employed in connection with the previous embodiment. We have designated one of the rollers for providing the advancement of the tubing by numeral 22. The tube 21 advances longitudinally with a V-shaped gap therein, the same as indicated at 11 in the first embodiment. The high frequency current is supplied by the electrodes, one of which is shown at 23, in the same manner as in Fig. 1. However, the impeder 24 in this embodiment may be the same general type as that disclosed in the patents above-identified, without however, the necessity of using cooling means. Means are provided in connection with this second embodiment longitudinally to oscillate or reciprocate the impeder along the heating region. This insures again that no surface portion of the impeder is continually subjected to the high temperature at the welding point. The reciprocations are of a frequency and amplitude to insure that a warm portion of the impeder is sufficiently removed often enough from the source of heat or heating area to allow it to cool sufficiently before it is again subjected to high temperature.

Any convenient means may be used to provide such reciprocations of the impeder. Specifically illustrated in Fig. 3 is a fluid motor, generally designated by numeral 25. The cylinder 26 contains a piston 27 and rod 28 which is oscillated back and forth by suitable known arrangements including a fluid pump (not shown). Ports 29 and 30 are provided to admit and exhaust the fluid. The cylinder and assembly is mounted on suitable supporting means as at 31. A connecting member 32 is provided to connect the piston rod 28 and the support 33 for the core 24, the core 24 being carried by the support 33.

Optional cooling means is provided at 34. This cooling means is conventional and may be used to spray a suitable cooling fluid onto the core in the vicinity of the welding zone, if found desirable.

The embodiment of the invention shown in Figs. 1 and 2 is particularly well adapted for the welding of a sheath of metal such as copper about a steel cable, to secure a uniform weld along the sheath while at the same time avoiding any danger of injury by heat to the cable. So far as is known, no other method has heretofore been devised which is suitable for effectively carrying out such a purpose.

In the embodiment shown in Figs. 4–7, parts corresponding to those of Fig. 1 are identified by the same reference characters accompanied by prime marks. As shown in Fig. 4, a more or less flat strip of skelp as indicated at S is drawn through a die member 40 to shape it as indicated into tubular form as it advances to the welding means such as described in connection with Fig. 1 and with a cable means as at 12', which may or may not be insulated, also continuously passing into the tubing as formed, preferably, although not necessarily, at the same rate of longitudinal movement.

The die 40 may comprise, or its internal portions at least may preferably comprise, a plastic member suitably shaped to cause the strip entering same to be rapidly curled transversely into a tubular shape, preferably with a gap 11', at opposite sides of which electrodes 17', 18' are applied. The die member may for example be formed of a phenol formaldehyde synthetic resin laminated, if desired, with material such as glass fiber sheets or paper. The die may be suitably mounted, adjustably if desired, by bracket means as at 41 and suitably clamped or held in position as by a set screw 42, whereby dies of various types, shapes and sizes may be used interchangeably. By forming the skelp into tubular form in this way, the heavy expensive tube mills heretofore generally necessary for the purpose are avoided, as are also the difficulties of time-consuming readjustments of the tube mills to accommodate tubing of different cross sections and sizes.

The die tube forming arrangement above described is particularly well adapted for shaping relatively thin-walled sheaths to tubular form, surrounding an advancing cable or the like, the latter aiding in preventing unintended displacement of the wall portions of the sheath as they are being shaped into the desired tube.

To hold and maintain the gap in the tubing with uniform dimensions, a suitable spreader means as at 45 is mounted to extend down into the gap shortly subsequent to the die 40 and so that the edges of the tube metal at the gap will be forced by the die firmly against the sides of the lower end of such spreader. Thus the spreader in conjunction with the die serves to maintain a uniform gap, whereby the conditions of mutual inductance with respect to the high frequency current flowing on the gap edges as they approach the weld point will be maintained uniform and thus insure uniform heating and a uniform weld at the point w at moments very shortly subsequent to the original formation of the tubing in the die.

In case it is not desired to have the high frequency current from the electrodes 17', 18' partially flow along the gap edges in advance of the electrodes, then the lower portion of the spreader at its sides may be formed with suitable ceramic inserts as at 46, or otherwise provided with insulation means to prevent short-circuiting of the gap edges at this region, for example in a manner disclosed in the copending application of William C. Kalning, Robert J. Stanton and Wallace C. Rudd, Serial No. 558,060, filed January 9, 1956.

In order to smooth out or eliminate any "flash" or irregularities along the welded seam which may tend to protrude inside the tubing, a metal member in the form of an elongated shoehorn as at 50 is mounted to extend along inside the tubing above the cable, one end being suitably supported through the gap 11' as by being suitably attached for example by welding to the spreader element 45. The raised inner end as at 50a of the member 50 preferably extends forwardly beyond the weld point w, it being understood that the sheath 10' as formed in the die is made of a diameter sufficiently larger than the cable 12' to permit at least some clearance for the member 50 in advance of the weld point. In order to press the upper side of the tubing 10' firmly down along the line of the welded seam 51 and against the area 50a on the member 50, a pressure roller as at 52 may be provided. In opposition to the pressure provided by the roller 52, if desired, a roller 53 may be mounted to engage the undersurface of the tube 10 at this region.

The member 50 is preferably formed of a suitable metal adapted to resist the temperatures occurring adjacent the weld point and to assist in cooling the member 50 if desired, the spreader member 45 may be formed with internal fluid cooling cavities as in the case of the electrodes 17' and 18' as disclosed in the above-mentioned patent.

At regions in advance of the weld point, it is contemplated that the diameter of the sheath will still be sufficiently large so that the member 50 will be spaced somewhat from the metal of the tube gap edges, and thus avoid short-circuiting the same.

In order to remove any scarf or "flash" irregularities from the external surfaces along the welded seam, a scraper element as at 55 may be suitably mounted and provided with a sharpened edge as at 56 to engage under pressure along the welded seam shortly subsequent to the weld point. Downward pressure by this member against the tubing may also be resisted by a roller urged against the undersurface of the tubing, or if desired, the same roller as indicated at 53 in Fig. 7.

The advancing tubing containing the advancing cable may then pass on through two or more pairs of opposed driven pressure applying rollers as indicated at 60, 61, 62 and 63. Thence the tube may be advanced through suitable known means as above explained, for bringing its diameter down so as to embrace the cable to the extent desired.

Although certain particular embodiments of the invention are herein disclosed for purposes of explanation, further modifications thereof, after study of this specification, will be apparent to those skilled in the art to which the invention pertains. For example, in accordance with some aspects of the invention, instead of applying the radio frequency current for resistance heating of the tube gap edges in the manner above described, the various methods and apparatus for that purpose may be used as disclosed in the co-pending application of Wallace C. Rudd and Robert J. Stanton, Serial No. 638,566, filed February 6, 1957, or other methods and apparatus such as disclosed in U.S. Patent No. 2,774,857 to Wallace C. Rudd and Robert J. Stanton, reference to both of which is hereby made. Reference should be had to the appended claims in determining the scope of the invention.

What is claimed and desired to be secured by Letters Patent is:

1. In apparatus for making metal tubing from a metal blank having been previously formed into a generally tubular configuration but having a longitudinal V-shaped gap between the edges of said blank, the combination comprising: a pair of contacts mounted respectively to be engaged by the surfaces of the metal of said blank along opposite sides of said gap at a position shortly in advance of a weld point; a source of current of a frequency of the order of about 100,000 cycles per second or higher connected to said contacts; means embodying a continuing element of magnetic material positioned inside said blank and extending longitudinally thereof; and means for concurrently advancing said blank and said element with relation to said contacts and past said weld point while bringing the edges of said blank together at said weld point, successive portions of said element acting to increase the reactance of the paths of current flow between said contacts in directions around said blank and to thereby increase the current flow along the edges of said V-shaped gap to and from the weld point.

2. Apparatus as claimed in claim 1 wherein said magnetic element is comprised in a multi-strand cable, about which the blank when welded forms a sheath.

3. In a process for forming a metal tube from a metal blank, said blank having been previously formed into a generally tubular configuration but having a longitudinal V-shaped gap between the edges of said blank, the combination of steps comprising: positioning a continuing element of magnetic material inside said blank; conducting high frequency heating current to said blank at positions on the surface thereof at opposite sides of said gap at locations in advance of a weld point to cause such current to flow from said locations along on said edges respectively to and from the weld point; and continuously longitudinally advancing said blank and said element with relation to the locations of application of said current and past said weld point while bringing the edges of said blank together at said weld point.

4. In a process for welding a longitudinal seam in a metal tube surrounding a steel cable, the combination of steps comprising: uniformly advancing the tubing longitudinally along with the cable as contained therein, while applying high frequency current to the metal of the tubing to heat same along the desired line of the welded seam at a region in advance of a weld point, and the cable as it is advanced in the tubing being spaced from the line of the seam and acting as an impeder checking the flow of high frequency current in paths extending circumferentially around the tubing.

5. Apparatus for forming and applying a metal sheath to cables comprising: means for longitudinally advancing a strip of skelp together with the cable; die means having a synthetic resinous interior for shaping such advancing strip into a sheath of tubular form surrounding the cable but of substantially larger diameter than the cable and having a longitudinal gap along which a welded seam is to be formed; a spreader in said gap following the die means and against which the gap edges leaving the die means slidably engage; means following said spreader for applying pressure to the sheath to close said gap at or adjacent a weld point; means for applying high frequency current to locations on opposite sides of the gap in advance of the weld point to flow from such locations to and from the weld point to heat the gap edges in advance of said weld point to welding temperature; and a device supported through said gap and extending out of contact with the heated edges of the gap and forwardly beyond the weld point within the sheath and between the interior walls thereof and the cable therein for engaging and smoothing out flash formations along the inside of the welded seam; means for applying pressure to the outside of the welded seam for urging the seam areas against said device.

6. Apparatus for forming and applying a metal sheath to cables comprising: means for longitudinally advancing a strip of skelp together with the cable; means for shaping such strip into tubular form surrounding the cable, but of substantially larger diameter than the cable, and having a longitudinal gap along which a welded seam is to be formed; means for applying pressure to the sheath to close said gap at or adjacent a weld point; means for applying radio frequency current to locations on opposite sides of the gap in advance of the weld point to flow from such locations to and from the weld point to heat the gap edges in advance of said weld point to welding temperature; a device supported through said gap and extending out of contact with the heated edges of the gap and forwardly beyond the weld point within the sheath and between the interior walls thereof and the cable therein for engaging and smoothing out flash formations along the inside of the welded seam; and means for applying pressure to the outside of the welded seam for urging the seam areas against said device.

7. Apparatus for forming and applying a metal sheath to cables comprising: means for longitudinally advancing a strip of skelp together with the cable; die means having a synthetic resinous interior for shaping such advancing strip into a sheath of tubular form surrounding the cable but of substantially larger diameter than the cable; means for applying pressure to the sheath to hold the edges of the strip in contact for welding at a weld point; means for applying high frequency current to locations on opposite sides of the gap in advance of the weld point to flow from such locations to and from the weld point to heat said edges in advance of said weld point to welding temperature; a device supported interiorly of the sheath and extending out of contact with the heated edges of the gap and forwardly beyond the weld point and between the interior walls of the sheath thereof and the cable therein for engaging and smoothing out flash formations along the inside of the welded seam; and means for applying pressure to the outside of the welded seam for urging the seam areas against said device.

8. In a method for forming a metal sheath with a longitudinally welded seam and enclosing a cable, the combination of steps which comprises: rapidly advancing metal tubing having a longitudinal gap therein and containing the cable in a position resting against the interior of the tubing opposite the gap and the tubing being of a diameter substantially larger than the cable, whereby the cable is spaced from the edges of said gap; applying pressure to close the gap substantially at the region of a weld point and conductively applying to points on opposite sides of the gap shortly in advance of the weld point heating current of a frequency of the order of about 100,000 cycles per second or higher to flow from said points to and from the weld point, thereby to heat the gap edges in advance of said weld point to welding temperature; applying means in the space between the cable and the interior of the welded seam shortly subsequent to the weld point to smooth out flash formations on the seam; and thereafter passing the sheathed cable through means to reduce the diameter of the sheath to embrace the cable.

References Cited in the file of this patent

UNITED STATES PATENTS

| | | |
|---|---|---|
| 403,157 | Thomson | May 14, 1889 |
| 2,020,276 | Crawford | Mar. 5, 1935 |
| 2,029,044 | Westlinning | Jan. 28, 1936 |
| 2,146,430 | Hazen | Feb. 7, 1939 |
| 2,697,769 | Carpenter | Dec. 21, 1954 |
| 2,697,772 | Kinghorn | Dec. 21, 1954 |
| 2,794,108 | Park | May 28, 1957 |

FOREIGN PATENTS

| | | |
|---|---|---|
| 1,095,095 | France | Dec. 15, 1954 |